(12) United States Patent
Yana

(10) Patent No.: US 10,269,185 B2
(45) Date of Patent: Apr. 23, 2019

(54) IMAGE FORMING APPARATUS

(71) Applicant: KYOCERA Document Solutions Inc., Osaka (JP)

(72) Inventor: Regil Yana, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/997,146

(22) Filed: Jun. 4, 2018

(65) Prior Publication Data

US 2018/0365907 A1 Dec. 20, 2018

(30) Foreign Application Priority Data

Jun. 19, 2017 (JP) ................. 2017-119672

(51) Int. Cl.
    | | |
    |---|---|
    | G07B 11/02 | (2006.01) |
    | G06K 15/02 | (2006.01) |
    | G06K 15/00 | (2006.01) |
    | G06K 19/06 | (2006.01) |
    | H04L 9/08 | (2006.01) |

(52) U.S. Cl.
    CPC ............ *G07B 11/02* (2013.01); *G06K 15/005* (2013.01); *G06K 15/025* (2013.01); *G06K 15/1889* (2013.01); *G06K 19/06037* (2013.01); *H04L 9/0861* (2013.01)

(58) Field of Classification Search
    CPC .... G07B 11/02; G06K 15/005; G06K 15/025; G06K 15/1889; G06K 19/06037; H04L 9/0861

USPC ........................................................ 358/1.14
See application file for complete search history.

(56) References Cited

U.S. PATENT DOCUMENTS

| | | | |
|---|---|---|---|
| 6,155,491 A * | 12/2000 | Dueker ................. | A63F 3/06 235/440 |
| 2007/0229879 A1 * | 10/2007 | Harmon ............... | G06F 3/1204 358/1.15 |
| 2016/0253858 A1 * | 9/2016 | Marquardt ............ | G06Q 40/02 271/10.02 |
| 2017/0006181 A1 * | 1/2017 | Nomura ............ | H04N 1/32144 |

FOREIGN PATENT DOCUMENTS

JP 2009-298106 A 12/2009

\* cited by examiner

*Primary Examiner* — Allen H Nguyen
(74) *Attorney, Agent, or Firm* — IP Business Solutions, LLC

(57) ABSTRACT

An image forming apparatus includes a code number generator that generates, when an operation reception unit receives user's designation of a number of tickets to be issued, a code key, and an encryption method, an encrypted code number for each of the designated number of tickets, with respect to each ticket number sequentially allocated to the designated number of tickets, using the designated code key and encryption method, a distinction image generator that generates, for each tickets, a distinction image containing the code number generated for each of the ticket, and a controller that adds, in each of the designated number of tickets, the distinction image of each of the tickets generated by the distinction image generator, to image data of an original of the ticket read by a document reading unit, and causes a printing unit to print each of the designated number of tickets.

6 Claims, 12 Drawing Sheets

INFORMATION !

(1) PLACE ORIGINAL OF TICKET ON GLASS TABLE (2) CLOSE GLASS TABLE COVER AND PRESS OK BUTTON

READING OF ORIGINAL OF TICKET WILL START

OK

RETURN

Fig.7

| NUMBER OF TICKETS TO BE ISSUED: 1000 SHEETS | | ENCRYPTION METHOD: DES |
|---|---|---|
| TICKET NUMBER | CODE KEY | CODE NUMBER |
| 1 | 2017 SUMMER FESTIVAL | ABC32679493714B |
| 2 | 2017 SUMMER FESTIVAL | FH4324HJ4343242 |
| 3 | 2017 SUMMER FESTIVAL | 890HGJFB4113218 |
| ------- | ------- | ------- |
| 1000 | 2017 SUMMER FESTIVAL | 785493DHJFYUIF0 |

55
55D

IMAGE FORMING APPARATUS

INCORPORATION BY REFERENCE

This application claims priority to Japanese Patent Application No. 2017-119672 filed on Jun. 19, 2017, the entire contents of which are incorporated by reference herein.

BACKGROUND

The present disclosure relates to an image forming apparatus, and more particularly to a technique to print and manage tickets to which a distinction image is added.

With reference to existing image forming apparatuses, it has been proposed to print, for example on a ticket, distinction information expressed as a distinction image for verifying the ticket, as a remedy for preventing counterfeiting. For example, a ticket can be made up by printing image data accompanied by the distinction information for distinction from another ticket, on a recording sheet.

SUMMARY

The disclosure proposes further improvement of the foregoing technique.

In an aspect, the disclosure provides an image forming apparatus including an operation reception unit, a document reading unit, a printing unit, a code number generator, a distinction image generator, and a controller. The operation reception unit receives an operation instruction from a user. The document reading unit reads an original of a ticket. The printing unit performs a printing operation on a recording medium. The code number generator generates, when the operation reception unit receives, from the user, designation of a number of tickets to be issued, a predetermined code key, and a predetermined encryption method, an encrypted code number for each of the designated number of tickets to be issued, with respect to each of ticket numbers sequentially allocated to the designated number of tickets to be issued, using the designated code key and the designated encryption method. The distinction image generator generates, when the code number generator generates the code number for each of the tickets, a distinction image for distinguishing one ticket from another, the distinction image containing the code number of the ticket generated for each of the tickets. The controller adds, in each of the designated number of tickets to be issued, the distinction image of each of the tickets generated by the distinction image generator, to the image data of the original of the ticket read by the document reading unit, and causes the printing unit to print each of the designated number of tickets to be issued.

BRIEF DESCRIPTION OF THE DRAWINGS

FIG. 4 is a schematic drawing showing an example of the screen displayed on a display unit of the image forming apparatus.

FIG. 7 is a schematic drawing showing an example of data stored in a storage unit of the image forming apparatus.

DETAILED DESCRIPTION

Figure 1:
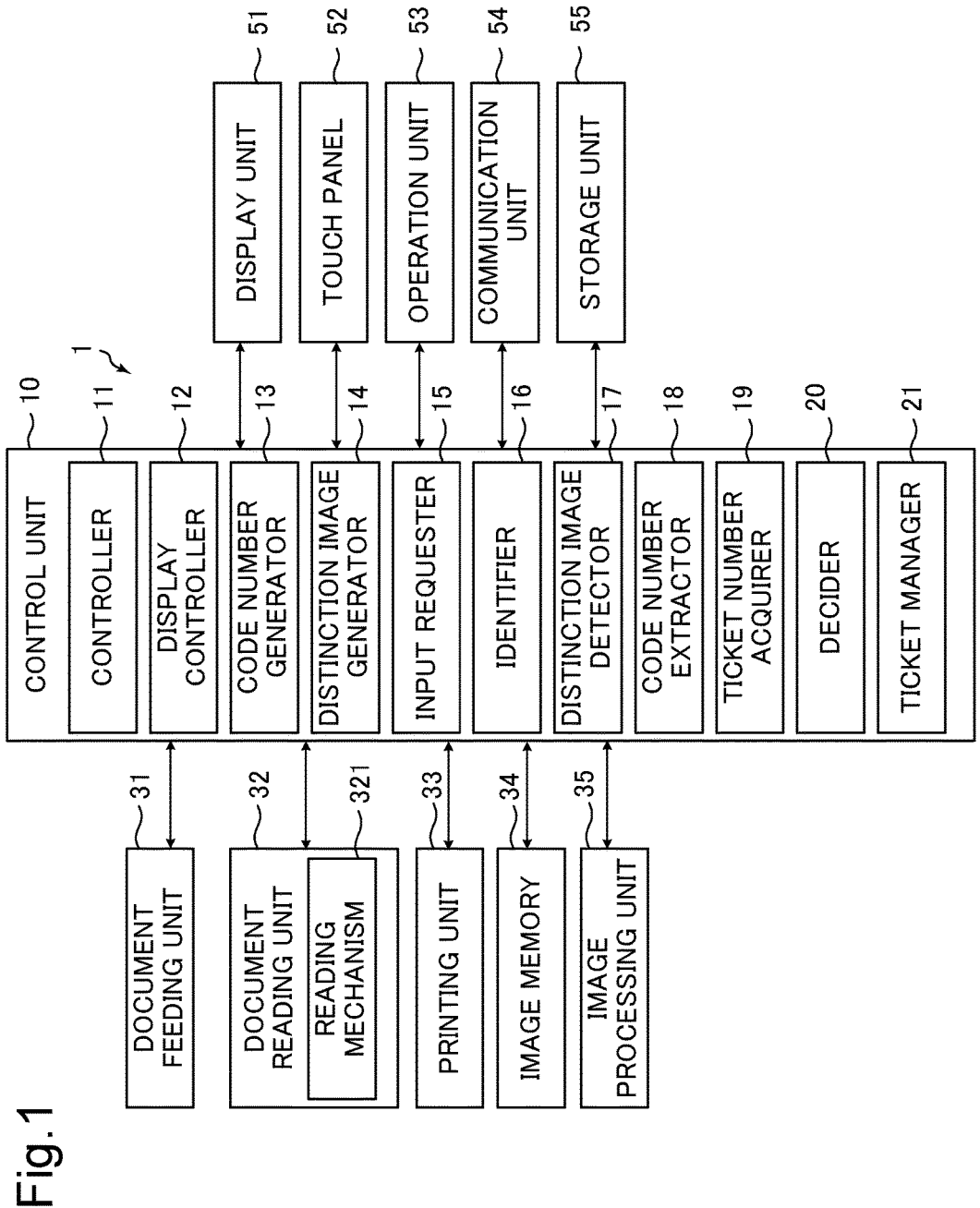
FIG. 1 is a functional block diagram showing an essential configuration of an image forming apparatus according to an embodiment of the disclosure.

Hereafter, an image forming apparatus according to an embodiment of the disclosure will be described, with reference to the drawings. FIG. 1 is a functional block diagram showing an essential configuration of the image forming apparatus according to the embodiment of the disclosure.

As shown in FIG. 1, the image forming apparatus 1 is a multifunction peripheral configured to execute a plurality of functions including, for example, a copying function, a printing function, a scanning function, and a facsimile function. The image forming apparatus 1 is configured to execute a ticket print mode for printing tickets for public performance of music, drama, or sports, and a theme park. In this mode, the image forming apparatus 1 adds, to the ticket, a distinction image for distinction of the ticket and prevention of counterfeiting of the ticket, when printing the ticket. The image forming apparatus 1 is also configured to execute a ticket management mode, to manage the validity of the ticket, by deciding whether the ticket is valid on the basis of the distinction image, with respect to the ticket to which the distinction image has been added (printed).

The image forming apparatus 1 includes a control unit 10, a document feeding unit 31, a document reading unit 32, a printing unit 33, an image memory 34, an image processing unit 35, a display unit 51, a touch panel 52, an operation unit 53, a communication unit 54, and a storage unit 55.

In a document reading operation of the image forming apparatus 1, the document reading unit 32 optically reads the image of a source document delivered from the document feeding unit 31, and generates image data.

In an image forming (printing) operation of the image forming apparatus 1, a controller of the control unit 10, to be subsequently described, causes the printing unit 33 to perform a printing operation on a recording sheet, exemplifying the recording medium, supplied from a non-illustrated paper cassette, according to the image data generated through the document reading operation, thereby forming the image on the recording sheet.

The document reading unit 32 includes a reading mechanism 321 having a light emitter and a CCD sensor. The document reading unit 32 is configured to read an image from the source document by irradiating the source document with the light emitter and receiving the reflected light with the CCD sensor, and to generate image data, under the control of the control unit 10. In addition, the document reading unit 32 reads the original of the ticket to be printed in the ticket print mode (i.e., ticket without the distinction image), and generates the corresponding image data.

The image memory 34 is a region for temporarily storing the image data acquired through the reading operation performed by the document reading unit 32, and data to be printed by the printing unit 33.

The image processing unit 35 retrieves the image read by the document reading unit 32 from the image memory 34, and processes the image. For example, the image processing unit 35 executes predetermined image processings such as shading correction, to improve the quality of the image formed by the printing unit 33 on the basis of the image read by the document reading unit 32.

The printing unit 33 forms the image based on, for example, the image data read by the document reading unit 32. To be more detailed, when the printing unit 33 performs color printing for example, an image forming subunit for magenta, an image forming subunit for cyan, an image forming subunit for yellow, and an image forming subunit for black in the printing unit 33 each form a toner image on a photoconductor drum on the basis of the image formed of the corresponding color component, through charging, exposing, and developing processes, and such toner image is transferred onto an intermediate transfer belt via a primary transfer roller.

The toner images of the respective colors are superposed at an adjusted timing when transferred onto the intermediate transfer belt, so as to form a colored toner image. A secondary transfer roller transfers the colored toner image formed on the surface of the intermediate transfer belt onto the recording sheet transported along a transport route from the paper cassette, at a nip region of a drive roller engaged with the intermediate transfer belt. Then a fixing unit fixes the toner image on the recording sheet by thermal compression. The recording sheet having the colored image formed and fixed thereon is discharged to an output tray.

The display unit 51 is constituted of, for example, a liquid crystal display or an organic EL display.

The touch panel 52 is provided on the front face of the display unit 51. The touch panel 52 is based on a resistive film or electrostatic capacitance, and configured to detect a contact (touch) made by the user, along with the touched position. Upon detecting the touch of the user, the touch panel 52 outputs a detection signal indicating the coordinate position of the touched position, to the controller.

The operation unit 53 includes hard keys such as a menu key for invoking a menu, arrow keys for moving focus of GUI representing the menu, and an enter key for confirming the GUI representing the menu. Here, the touch panel 52 and the operation unit 53 are examples of the operation reception unit in the disclosure.

The communication unit 54 includes a communication module such as a LAN board, and performs data communication with information processing devices or the like under the control of the controller, through a network to which the communication unit 54 is connected.

The storage unit 55 is a large-capacity storage device such as a hard disk drive (HDD) and a solid state drive (SSD). When the operation reception unit receives a designation of the number of tickets to be issued, a predetermined code key, and a predetermined encryption method from the user, the storage unit 55 stores, in advance, the designated number of tickets to be issued, the designated code key, the designated encryption method, and a ticket number to be subsequently described, with respect to each type of the ticket.

The control unit 10 serves to control the overall operation of the image forming apparatus 1. The control unit 10 includes a controller 11, a display controller 12, a code number generator 13, a distinction image generator 14, an input requester 15, an identifier 16, a distinction image detector 17, a code number extractor 18, a ticket number acquirer 19, a decider 20, and a ticket manager 21.

The control unit 10 includes a processor, a random-access memory (RAM), a read-only memory (ROM), and so forth. The processor is, for example, a central processing unit (CPU), a MPU, an ASIC, or the like. The control unit 10 acts as the controller 11, the display controller 12, the code number generator 13, the distinction image generator 14, the input requester 15, the identifier 16, the distinction image detector 17, the code number extractor 18, the ticket number acquirer 19, the decider 20, and the ticket manager 21, when the processor executes a program stored in the storage unit 55. Here, the controller 11, the display controller 12, the code number generator 13, the distinction image generator 14, the input requester 15, the identifier 16, the distinction image detector 17, the code number extractor 18, the ticket number acquirer 19, the decider 20, and the ticket manager 21 may each be constituted in the form of a hardware circuit, instead of being performed according to the program. This also applies to other embodiments, unless otherwise specifically noted.

The controller 11 is connected to the document feeding unit 31, the document reading unit 32, the printing unit 33, the image memory 34, the image processing unit 35, the display unit 51, the touch panel 52, the operation unit 53, the communication unit 54, and the storage unit 55, and controls the operation of the mentioned components.

The display controller 12 is configured to control the displaying operation performed by the display unit 51.

The code number generator 13 generates, when the operation reception unit receives, from the user, the designation of the number of tickets to be issued, the predetermined code key, and the predetermined encryption method, an encrypted code number for each of the designated number of tickets, with respect to each of the ticket numbers sequentially allocated to the designated number of tickets, using the designated code key and the designated encryption method. For example, when 5000 tickets is designated as the number of tickets to be issued, the code number generator 13 generates an encrypted code number (e.g., 15-digit number composed of alphabets and numerals) with respect to a ticket number N, N being one of integers from 1 to 5000 sequentially allocated to the 5000 tickets, by encrypting the ticket number N according to the designated encryption method, using the designated code key.

The code key includes, for example, the name of the event corresponding to the ticket (e.g., 34th Osaka Performance). Examples of the applicable encryption method include the advanced encryption standard (AES), the data encryption standard (DES), Blowfish, and Twofish.

The distinction image generator 14 generates, when the code number generator 13 generates the code number of each of the tickets, a distinction image for distinguishing one ticket from another, with respect to each of the tickets, the distinction image containing the code number of the ticket generated for each of the tickets. The distinction image may include a QR code (registered trademark) or a bar code. In addition, as will be subsequently described in further detail, the distinction image generator 14 generates, when the operation reception unit receives the designation of the type of the distinction image (e.g., whether QR code or bar code) from the user, the distinction image for the ticket corresponding to the code number, by embedding the code number in the distinction image of the designated type.

When the distinction image is generated, the display controller 12 causes the display unit 51 to display a preview image showing an example of the position of the distinction image in the image representing the ticket to be printed, using the distinction image generated as above, and the image data of the original of the ticket acquired through the reading operation of the document reading unit 32. In addition, the display controller 12 causes the display unit 51 to display, when the operation reception unit receives from the user an instruction to change the position of the distinction image in the preview image, a changed preview image in which the distinction image has been moved to the instructed position.

When the operation reception unit receives from the user an instruction to determine the position of the distinction image, while the preview image is displayed, the controller 11 causes the printing unit 33 to print the ticket on which the distinction image is located at the position determined according to the instruction. Further, when the ticket is to be printed, the controller 11 adds, in each of the designated number of tickets, the distinction image of each of the tickets generated by the distinction image generator 14, to the image data of the original of the ticket read by the document reading unit 32, and causes the printing unit 33 to print each of the designated number of tickets.

The input requester 15 requests the user, when the operation reception unit receives an instruction of management with respect to a predetermined ticket (i.e., instruction to execute the ticket management mode) from the user, to input the number of tickets to be issued, the code key used for the ticket, and the encryption method used for the ticket.

When the operation reception unit receives the user's input of the number of tickets to be issued, the code key used for the ticket, and the encryption method used for the ticket, the identifier 16 identifies the type of the ticket to be managed, on the basis of the number of tickets, the code key, and the encryption method which have been inputted. For example, in the case where "1000" is inputted as the number of tickets, "2017 Summer Festival" is inputted as the code key, and "DES" is inputted as the encryption method, the identifier 16 decides that the type of tickets to be managed includes 1000 tickets for admission to "2017 Summer Festival", on each of which a distinction image, containing the code number encrypted from one of the ticket numbers from 1 to 1000 by the encryption method of DES, is printed.

The distinction image detector 17 detects the distinction image from the image data of the ticket read by the document reading unit 32. For example, the distinction image detector 17 detects, by pattern matching with respect to the image data, the distinction image including the bar code or QR code printed on (added to) the ticket.

The code number extractor 18 analyzes the distinction image (bar code or QR code) detected by the distinction image detector 17, to thereby extract the code number from the distinction image.

The ticket number acquirer 19 acquires the ticket number, by decrypting the code number extracted by the code number extractor 18, using the inputted code key and the inputted encryption method.

The decider 20 decides whether the ticket number acquired by the ticket number acquirer 19 and the ticket number corresponding to the type of the ticket identified by the identifier 16 and stored in the storage unit 55 agree with each other.

When it is decided that the ticket number acquired by the ticket number acquirer 19 and the ticket number stored in the storage unit 55 agree with each other, the ticket manager 21 classifies the ticket of the agreeing ticket number as being valid. In contrast, when it is decided that the ticket number acquired by the ticket number acquirer 19 and the ticket number stored in the storage unit 55 do not agree with each other, the ticket manager 21 classifies the ticket of the disagreeing ticket number as being invalid.

The ticket manager 21 also generates, when the identifier 16 identifies the type of the ticket to be managed, a check sheet for storing the history of the classification of the ticket as being valid, with respect to each of the ticket numbers based on the number of tickets to be issued, and stores the check sheet in the storage unit 55. Further, upon detecting by looking up the check sheet stored in the storage unit 55 that the ticket of the same ticket number has been classified as being valid more than twice, the ticket manager 21 decides that such ticket has been printed in duplicate. In addition, upon detecting that the ticket of the same ticket number has been classified as being valid more than twice, the ticket manager 21 stores the value indicating the number of times that the ticket has been classified as being valid, in the check sheet.

The display controller 12 causes the display unit 51 to display the ticket number of the tickets managed by the ticket manager 21, and the detail of the management with respect to the ticket. For example, when the ticket manager 21 classifies a ticket as "valid", "invalid", or "printed in duplicate", the display controller 12 causes the display unit 51 to display the ticket number and the management decision, in association with each other.

Referring now to FIG. 2 to FIG. 12, the operation of the image forming apparatus 1 according to this embodiment will be described in detail. The following description will primarily focus on the cases where the image forming apparatus 1 executes the ticket print mode and the ticket management mode.

Figure 2:
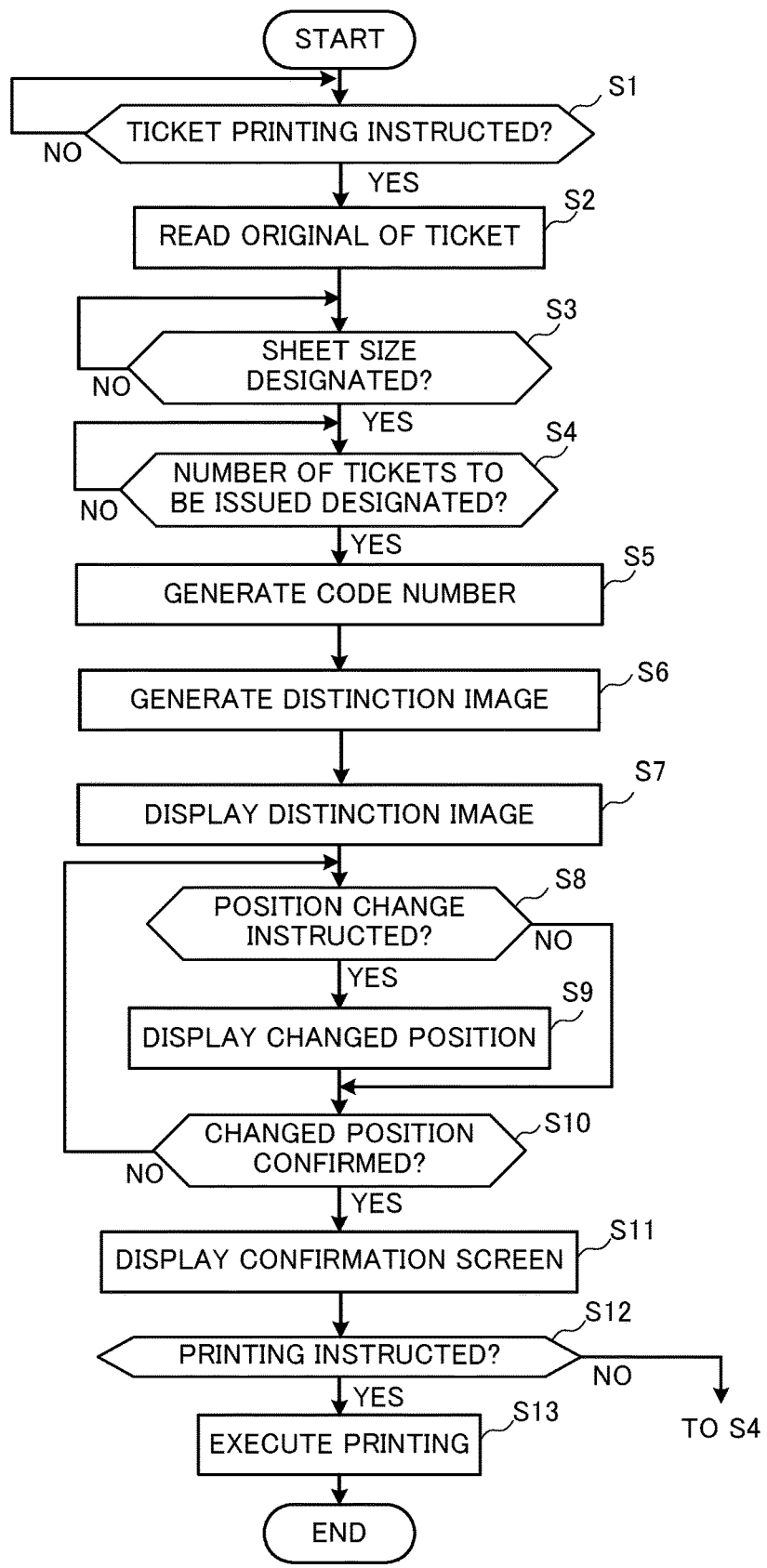
FIG. 2 is a flowchart showing an operation process performed by the image forming apparatus.

First, the operation executed by the image forming apparatus 1 according to this embodiment in the ticket print mode will be described with reference to FIG. 2. FIG. 2 is a flowchart showing the operation process performed by the image forming apparatus. The following description is based on the assumption that "2017 Summer Festival", representing the event for which the ticket is intended, is adopted as the code key.

As shown in FIG. 2, the controller 11 decides whether the operation reception unit has received an instruction to execute the ticket print mode, from the user (S1). For example, the controller 11 detects whether a ticket print mode key 52A has been selected by the user, after the display controller 12 has caused the display unit 51 to display a screen shown in FIG. 3 urging the user to instruct an operation, thereby deciding whether the execution of the ticket print mode has been instructed. In the case where the selection of the ticket print mode key 52A has not been detected through the touch panel 52 (NO at S1), the controller 11 sets the image forming apparatus 1 to a standby mode, instead of proceeding to step S2.

In contrast, upon detecting that the ticket print mode key 52A has been selected by the user through the touch panel 52 (YES at S1), the controller 11 decides that the execution of the ticket print mode has been requested. Then the display controller 12 causes the display unit 51 to display a screen, for example as shown in FIG. 4, urging the user to cause the document reading unit 32 to read the original of the ticket that the user wishes to print. In the case where a press of an OK button on the display screen shown in FIG. 4 has been detected through the touch panel 52, the controller 11 causes the document reading unit 32 to read the original of the ticket (S2), and stores the image data that has been read in the image memory 34.

The controller 11 then decides whether the operation reception unit has received the user's instruction of the size of the recording sheet to be used for printing, and the number of tickets to be printed on one recording sheet (S3). For example, the display controller 12 causes the display unit 51 to display a screen shown in FIG. 5, urging the user to select the size of the recording sheet and the number of tickets. More specifically, the display controller 12 causes the display unit 51 to display a pulldown menu 52C for the user to select the size of the recording sheet, as illustrated in the display screen of FIG. 5.

Figure 5:
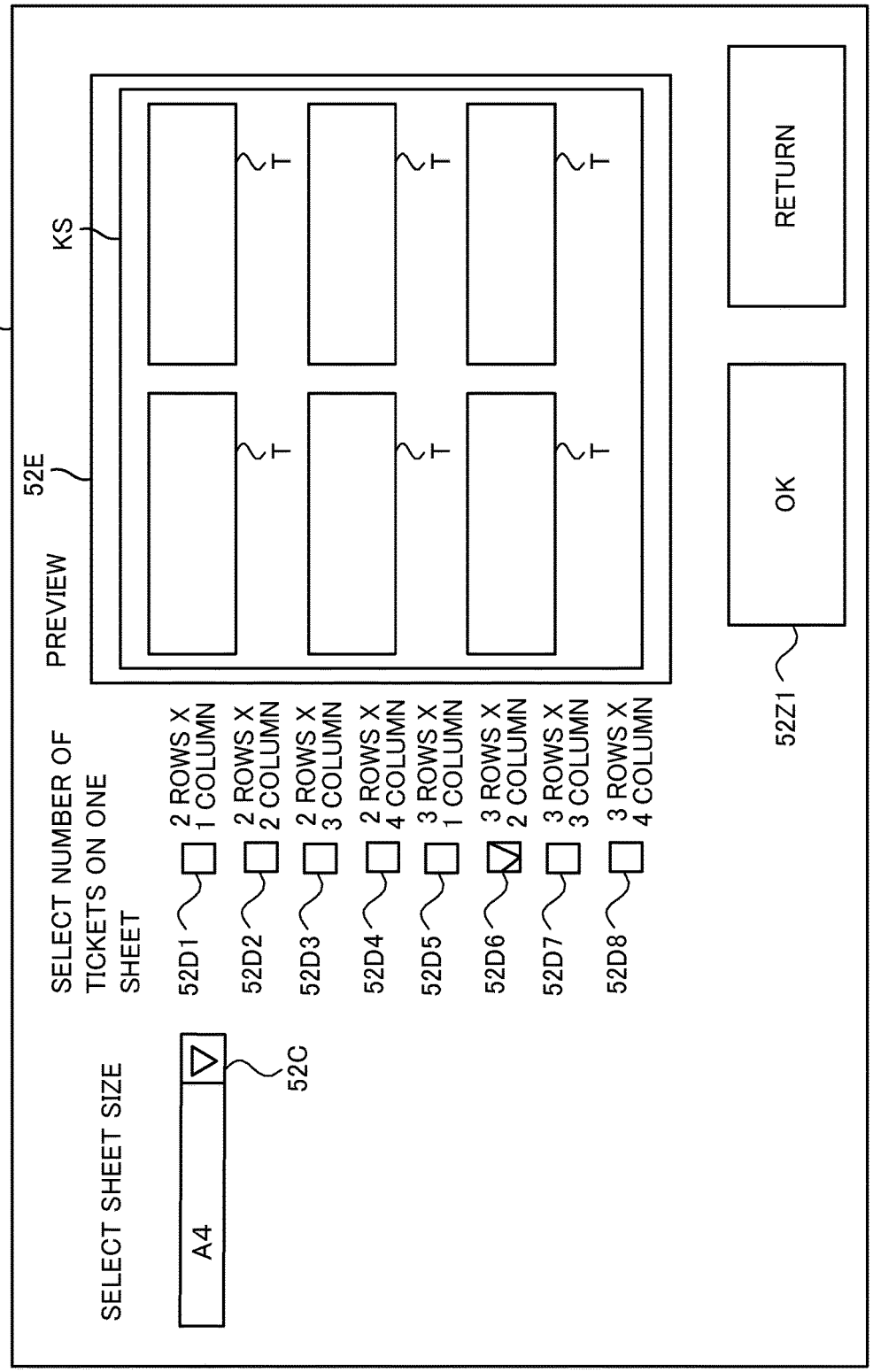
FIG. 5 is a schematic drawing showing an example of the screen displayed on a display unit of the image forming apparatus.

The display controller 12 also causes the display unit 51 to display a screen for urging the user to designate the number of rows and the number of columns of the tickets to be printed on one recording sheet, for example a check box 52D1 for designating "2 rows×1 column" as illustrated in the display screen of FIG. 5. Likewise, the display controller 12 causes the display unit 51 to display a check box 52D2 for designating "2 rows×2 columns", a check box 52D3 for designating "2 rows×3 columns", a check box 52D4 for designating "2 rows×4 columns", a check box 52D5 for designating "3 rows×1 column", a check box 52D6 for designating "3 rows×2 columns", a check box 52D7 for designating "3 rows×3 columns", and a check box 52D8 for designating "3 rows×4 columns". Then upon detecting through the touch panel 52 that the pulldown menu 52C has been pressed by the user to select "A4", and that the check box 52D6 has been selected by the user, as illustrated in the display screen of FIG. 5, the display controller 12 causes the display unit 51 to display a preview image generated on the basis of the size of the recording sheet and the number of tickets that have been selected, in a preview field 52E of the display unit 51.

For example, the display controller 12 causes the display unit 51 to display a preview image, in which six tickets T are arranged in 3 rows and 2 columns on a recording sheet KS as illustrated in the display screen of FIG. 5, in the preview field 52E. Here, for the sake of simplification of the drawing, the image based on the image data of the original of the ticket, read at step S2, is omitted from the six tickets T, in the display screen of FIG. 5.

The controller 11 then decides whether an OK key 52Z1 in the display screen of FIG. 5 has been pressed by the user, thereby deciding whether the size of the recording sheet and the number of tickets have been designated. In the case where the pressing of the OK key 52Z1 has not been detected through the touch panel 52 (NO at S3), the controller 11 sets the image forming apparatus 1 to the standby mode, instead of proceeding to step S4.

Figure 6:
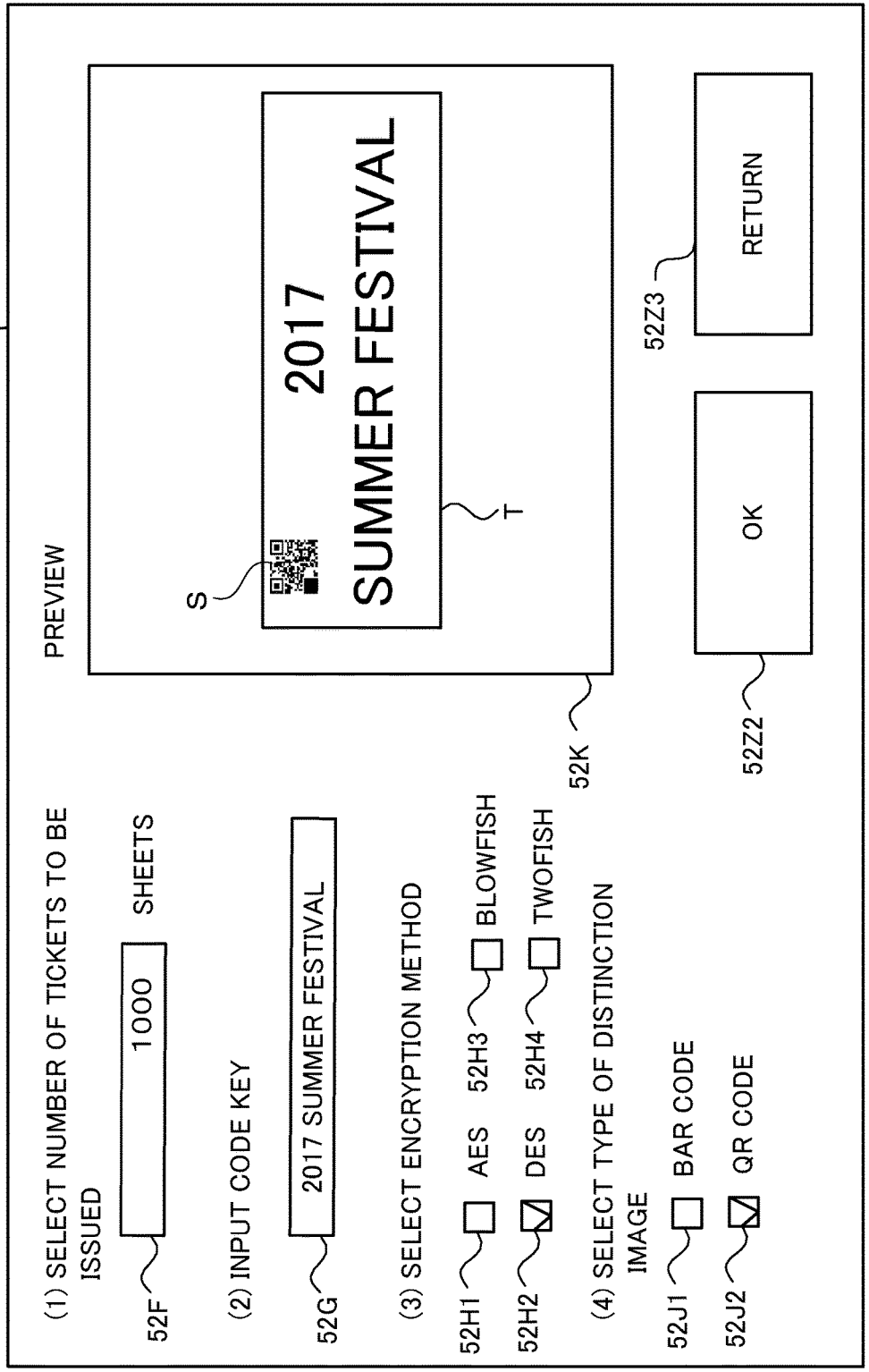
FIG. 6 is a schematic drawing showing an example of the screen displayed on a display unit of the image forming apparatus.

In contrast, in the case where it has been detected through the touch panel 52 that the user has pressed the OK key 52Z1 (YES at S3), the controller 11 decides that the number of tickets to be printed on one recording sheet has been designated by the user. The controller 11 then decides whether the number of tickets to be issued, the code key, the encryption method, and the type of distinction image have been designated by the user, through the operation reception unit (S4). For example, the display controller 12 causes the display unit 51 to display a screen urging the user to designate the number of tickets to be issued, the code key, the encryption method, and the type of distinction image, as shown in FIG. 6. More specifically, the display controller 12 causes the display unit 51 to display an input field 52F, for the user to input the number of tickets to be issued using a non-illustrated ten key, as illustrated in the display screen of FIG. 6. In addition, the display controller 12 causes the display unit 51 to display an input field 52G, for the user to input the code key using the non-illustrated ten key and character keys, as illustrated in the display screen of FIG. 6.

Further, the display controller 12 causes the display unit 51 to display, as illustrated in the display screen of FIG. 6, a check box 52H1 for the user to designate the encryption method "AES", a check box 52H2 for the encryption method "DES", a check box 52H3 for the encryption method "Blowfish", and a check box 52H4 for the encryption method "Twofish". The display controller 12 also causes the display unit 51 to display a check box 52J1 for the user to designate the type of distinction image "bar code", and a check box 52J2 for the type of distinction image "QR code", as illustrated in the display screen of FIG. 6.

In the case where it has not been detected, through the touch panel 52, that the number of tickets has been designated in the input field 52F, the code key has been designated in the input field 52G, one of the check boxes 52H1 to 52H4 for the encryption method has been checked, either of the check boxes 52J1 and 52J2 for the type of distinction image has been checked, and that the OK key 52Z2 has been pressed in the display screen shown in FIG. 6 (NO at S4), the controller 11 sets the image forming apparatus 1 to the standby mode, instead of proceeding to step S5.

In contrast, upon detecting through the touch panel 52 that, as illustrated in the display screen of FIG. 6, "1000" has been inputted by the user in the input field 52F as the number of tickets to be issued, "2017 Summer Festival" has been inputted in the input field 52G as the code key, the check box 52H2 and the check box 52J2 have been checked by the user, and that the OK key 52Z2 has been pressed by the user (YES at S4), the controller 11 decides that user has made the instruction to generate the distinction image for identifying the ticket, on each of the 1000 tickets to be issued. In addition, the controller 11 stores the number of tickets to be issued, the code key, the encryption method, and the type of distinction image, which have been designated by the user, in the storage unit 55, with respect to each type of the ticket.

Then the code number generator 13 generates the code numbers encrypted from the respective ticket numbers of the 1000 tickets (e.g., ticket number 1 to ticket number 1000), using the number of tickets to be issued, the code key, and the encryption method designated at step S4 (S5). The code number generator 13 also stores the generated code numbers in a memory region 55D in the storage unit 55, in association with the number of tickets to be issued, the code key, and the encryption method designated at step S4, for example as illustrated in FIG. 7. Here, the code number generator 13 generates a different code number for each of the ticket numbers, as exemplified in FIG. 7. The memory region 55D also includes a database (see FIG. 7) in which the number of tickets to be issued, the code key, the encryption method, the ticket number, and the code number are registered in association with one another, with respect to each type of the ticket to be managed in the ticket management mode (i.e., ticket generated in the ticket print mode).

Thereafter, the distinction image generator 14 generates the distinction image, in which the code number generated for each ticket at step S5 is embedded, with respect to each of the corresponding tickets, using the type of distinction image designated at step S4 (i.e., QR code) (S6). For example, the distinction image generator 14 generates a QR code S, in which a code number "ABC326794937148" produced for the ticket having the ticket number 1 (see FIG. 7) is embedded, as the distinction image for the ticket of the ticket number 1. The distinction image generator 14 also stores the image data representing the distinction image generated as above, in the storage unit 55, in association with the ticket number and other data.

The display controller 12 then causes the display unit 51 to display a screen urging the user to instruct the position on the ticket where the distinction image generated at step S6 is to be located. For example, as illustrated in the display screen of FIG. 6, the display controller 12 causes the display unit 51 to display a preview image in a preview field 52K, using the image data of the ticket T acquired through the reading operation at step S2, and the image data of the distinction image S generated at step S6.

The display controller 12 detects, for example, whether the user has performed a drag operation of the distinction image S displayed in the preview field 52K, to thereby decide whether the user's instruction to change the position of the distinction image S in the preview image has been received through the touch panel 52 (S8). In the case where the instruction to change the position of the distinction image S has not been received through the touch panel 52 (NO at S8), the display controller 12 proceeds to step S10, which will be subsequently described.

In contrast, in the case where the instruction to change the position of the distinction image S has been received through the touch panel 52 (YES at S8), the display controller 12 causes the display unit 51 to display a changed preview image, in which the distinction image S is located at the instructed position, in the preview field 52K. Then the controller 11 detects whether the OK key 52Z2 of a Return key 52Z3 has been pressed by the user, for example in the display screen of FIG. 6, to thereby decide whether the change of the position of the distinction image S has been confirmed by the user (S10). In the case where the controller 11 detects, through the touch panel 52, that the Return key 52Z3 has been pressed by the user (NO at S10), the controller 11 returns to step S8 to repeat the same operation.

In contrast, in the case where the controller 11 detects, through the touch panel 52, that the OK key 52Z2 has been pressed by the user (YES at S10), the controller 11 decides that the change of the position of the distinction image S on the ticket T has been confirmed by the user ticket T. The display controller 12 then causes the display unit 51 to display, for example as shown in FIG. 8, a screen urging the user to confirm the details of the printing operation of the ticket T (e.g., items (1) to (4) in FIG. 8) (S11).

Figure 8:
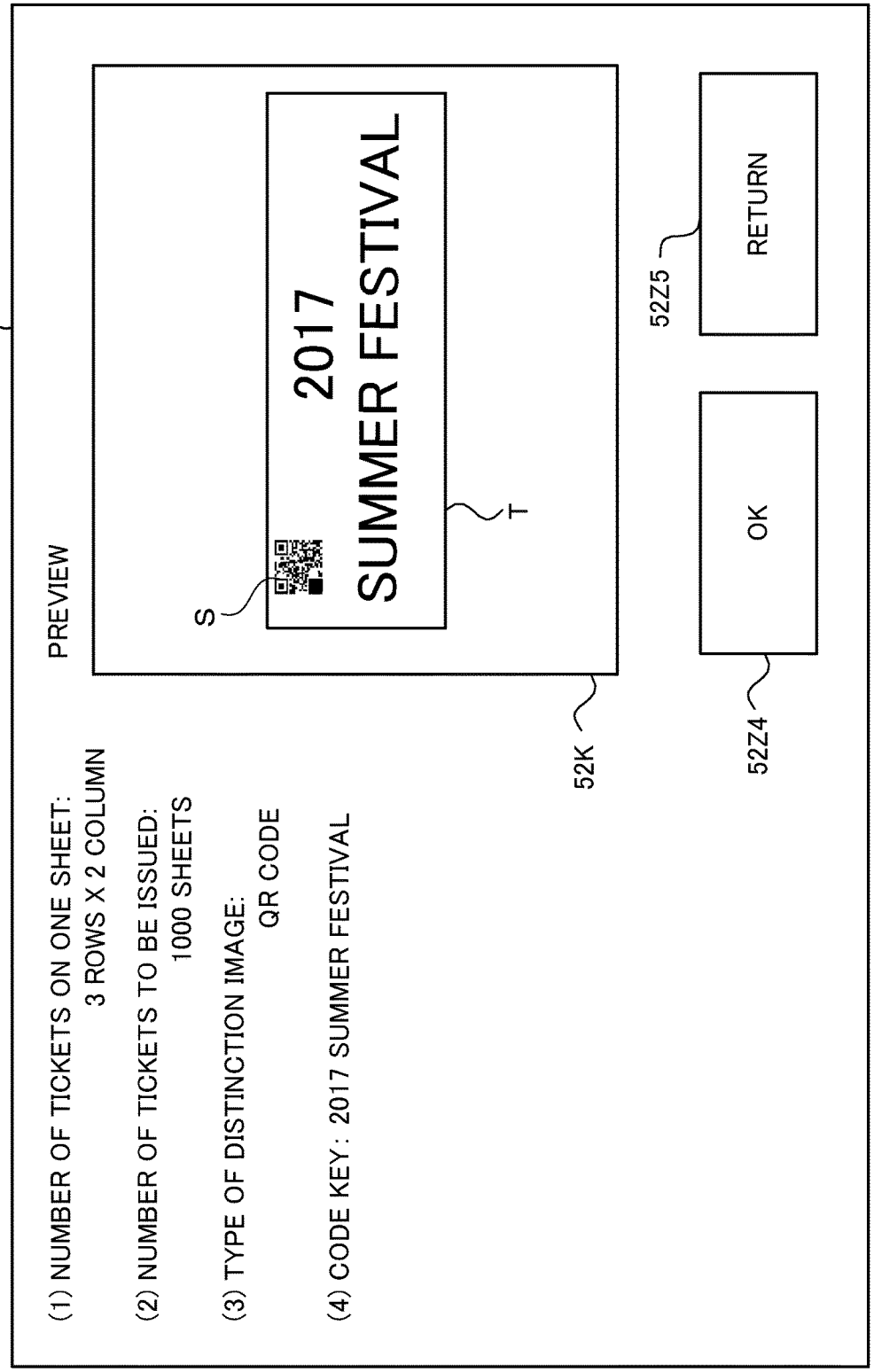
FIG. 8 is a schematic drawing showing an example of the screen displayed on a display unit of the image forming apparatus.

Thereafter, the controller 11 decides whether the user has instructed to execute the printing of the ticket T, for example by detecting whether one of the OK key 52Z4 and the Return key 52Z5 has been pressed by the user, in the display screen shown in FIG. 8 (S12). In the case where the controller 11 detects, through the touch panel 52, that the Return key 52Z5 has been pressed by the user (NO at S12), the controller 11 returns to step S4 to repeat the same operation.

In contrast, in the case where the controller 11 detects, through the touch panel 52, that the OK key 52Z4 has been pressed by the user (YES at S12), the controller 11 decides that the user has instructed to execute the printing, under the conditions specified in the display screen shown in FIG. 8. The controller 11 then causes the printing unit 33 to execute the printing, on the basis of the image data of the ticket T, to which the image data of the distinction image S has been added (S13). For example, the controller 11 adds, in each of the 1000 tickets, the distinction image for each ticket generated by the distinction image generator 14, to the image data of the original of the ticket read by the document reading unit 32, and causes the printing unit 33 to print the 1000 tickets.

Figure 9:
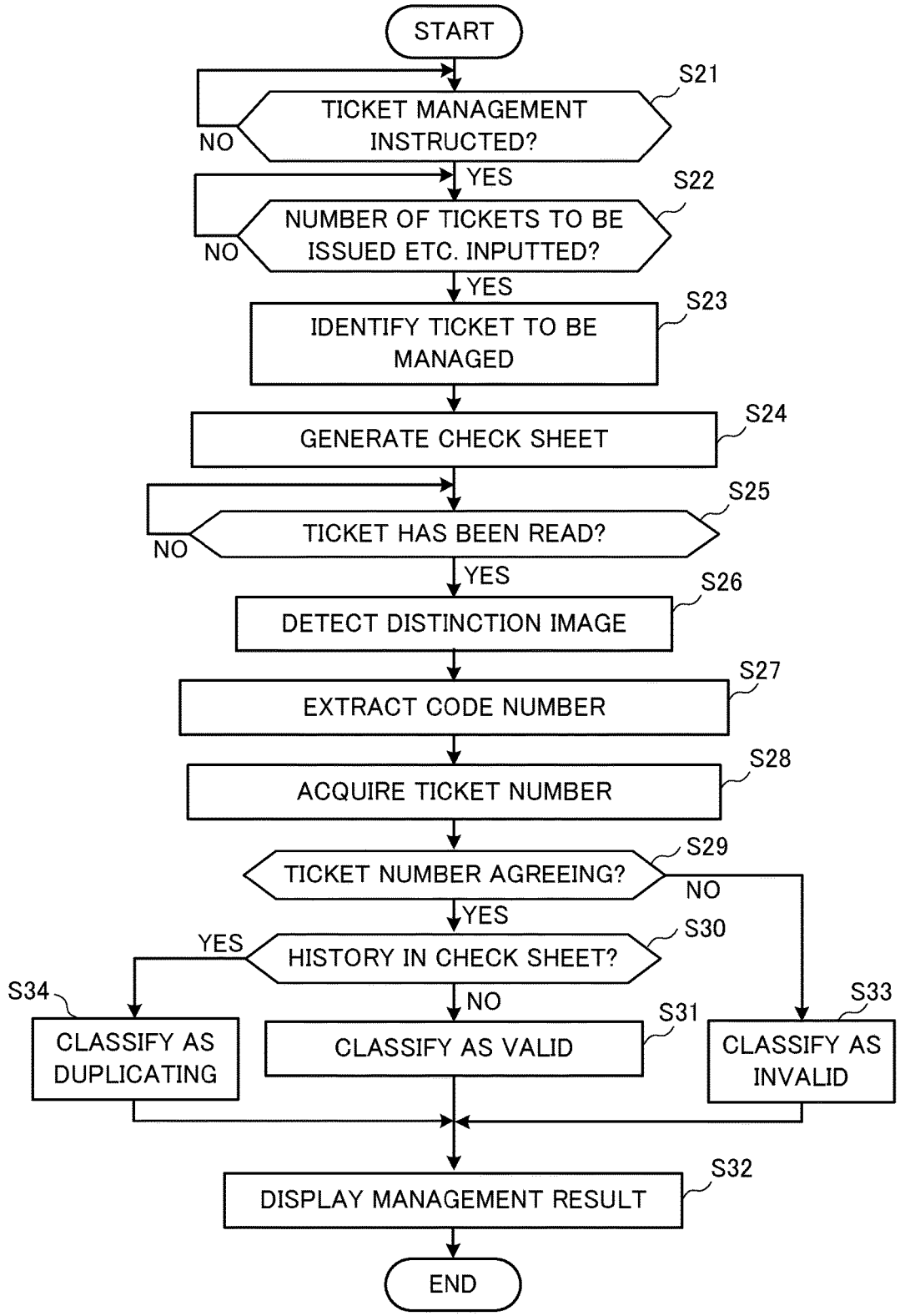
FIG. 9 is a flowchart showing another operation process performed by the image forming apparatus.

Referring now to FIG. 9, the operation executed by the image forming apparatus 1 according to this embodiment in the ticket management mode will be described. FIG. 9 is a flowchart showing another operation process performed by the image forming apparatus.

Figure 3:
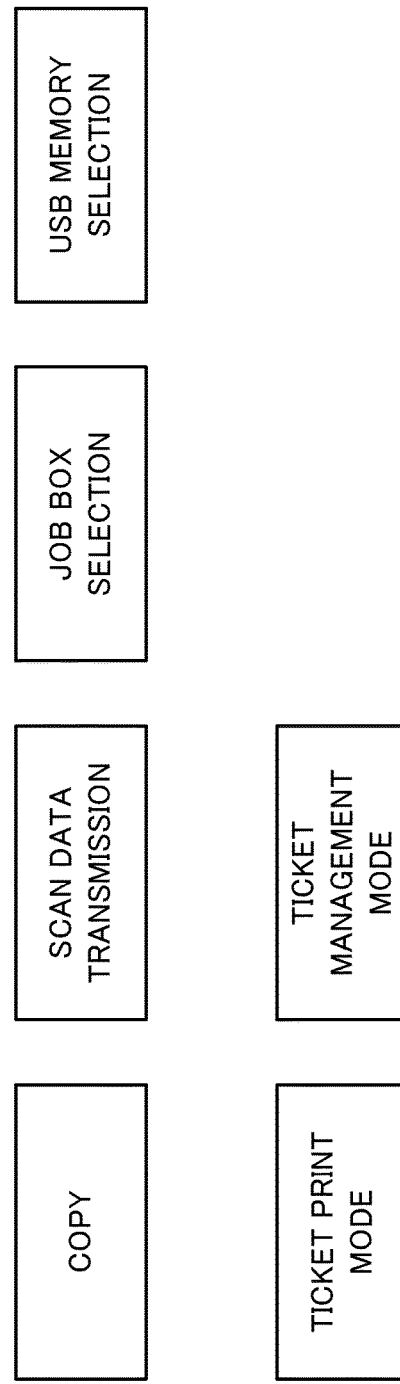
FIG. 3 is a schematic drawing showing an example of a screen displayed on a display unit of the image forming apparatus.

As shown in FIG. 9, first the controller 11 decides whether the operation reception unit has received the user's instruction to execute the ticket management mode (S21). The controller 11 decides whether the user has instructed to execute the ticket management mode, for example by detecting whether a ticket management mode key 52B has been pressed by the user, when the display controller 12 has caused the display unit 51 to display a screen urging the user to select the operation, as shown in FIG. 3. In the case where controller 11 has not detected through the touch panel 52 that the ticket management mode key 52B has been pressed (NO at S21), the controller 11 sets the image forming apparatus 1 to the standby mode, instead of proceeding to step S22.

In contrast, in the case where controller 11 has detected through the touch panel 52 that the ticket management mode key 52B has been pressed (YES at S21), the controller 11 decides that the execution of the ticket management mode has been instructed. Then the input requester 15 requests the user to input the number of tickets to be managed by the ticket management mode, and the code key and encryption method applied to the ticket. For example, the input requester 15 causes the display unit 51 to display the screen shown in FIG. 6, to thereby request the user to input the number of tickets to be issued, and the code key and encryption method applied to the ticket. Further, the input requester 15 requests the user to input the type of distinction image applied to the ticket to be managed, as illustrated in the display screen of FIG. 6.

Here, the input requester 15 may only request the user to input the number of tickets to be issued, the code key, and the encryption method, without requesting the user to input the type of distinction image. However, in the case where the type of distinction image is inputted according to the request of the input requester 15, the distinction image can be detected at step S26 to be subsequently described, with the type of distinction image already identified. Therefore, it is more preferable that the input requester 15 requests the user to also input the type of distinction image, from the viewpoint of simplifying the detection process.

Then the controller 11 decides whether the operation reception unit has received the input of the number of tickets to be issued, the code key, the encryption method, and the type of distinction image, made by the user (S22). For example, in the case where it has not been detected through the touch panel 52 that the number of tickets has been inputted in the input field 52F, the code key has been inputted in the input field 52G, one of the check boxes 52H1 to 52H4 for the encryption method has been checked, one of the check box 52J1 and the check box 52J2 for the distinction image has been checked, and that the OK key 52Z2 has been pressed, in the display screen shown in FIG. 6 (NO at S22), the controller 11 sets the image forming apparatus 1 to the standby mode, instead of proceeding to step S23.

In contrast, upon detecting through the touch panel 52 that "1000" has been inputted by the user in the input field 52F as the number of tickets to be issued, "2017 Summer Festival" has been inputted in the input field 52G as the code key, the check box 52H2 and the check box 52J2 have been checked by the user, and that the OK key 52Z2 has been pressed by the user (YES at S22), the controller 11 decides that the tickets to be managed have been designated by the user. Then the identifier 16 identifies the type of tickets to be managed, on the basis of the number of tickets to be issued, the code key, and the encryption method that have been inputted (S23). More specifically, the identifier 16 identifies, as the tickets to be managed, the 1000 tickets named as 2017 Summer Festival, and each having the distinction image printed thereon, in which a code number encrypted from one of the ticket numbers from 1 to 1000 by the encryption method "DES" is contained.

Figure 10:
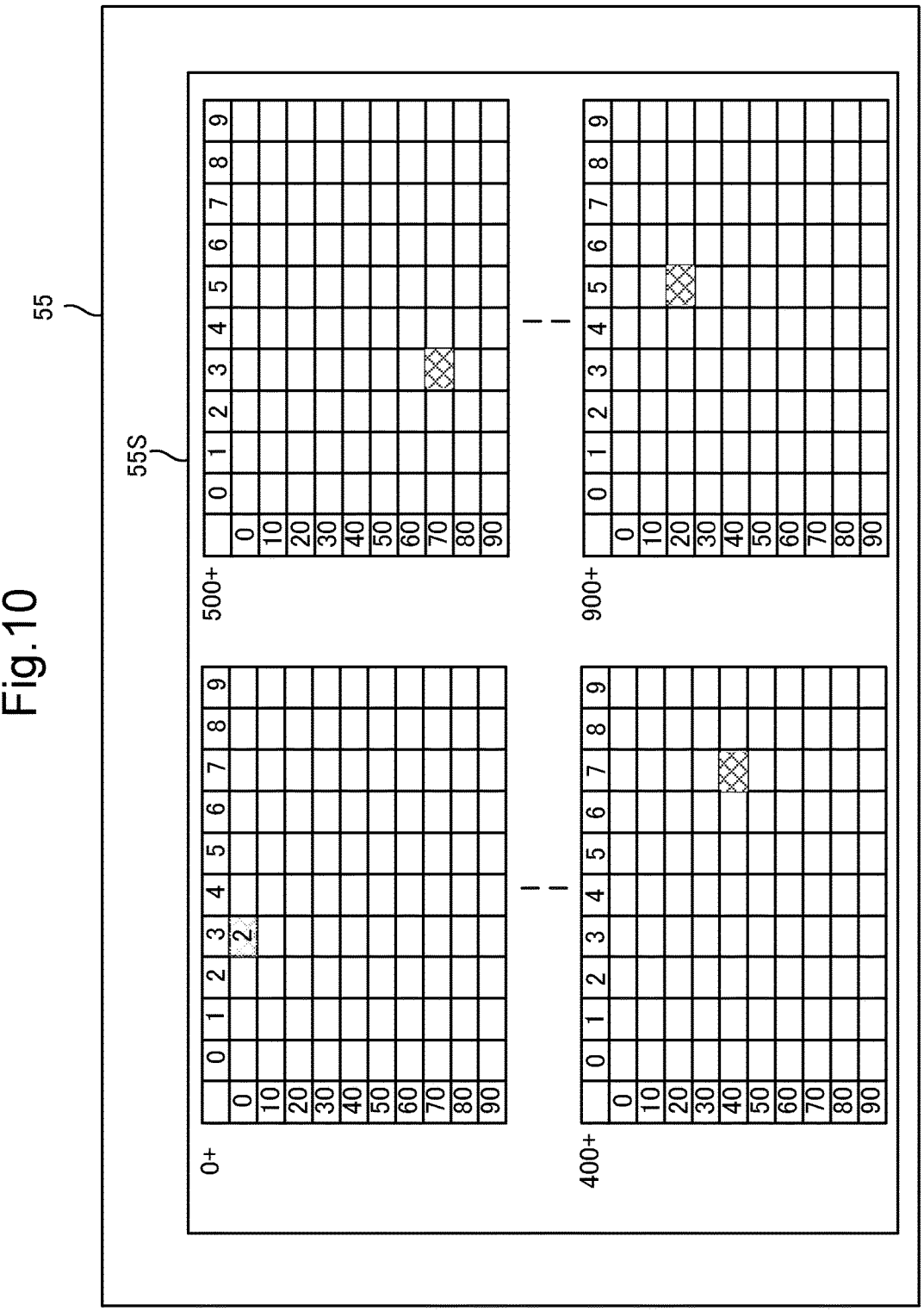
FIG. 10 is a schematic drawing showing an example of the data stored in the storage unit of the image forming apparatus.

Thereafter, the ticket manager 21 generates the check sheet for storing the history of classifying the ticket as being valid, with respect to each of the ticket number of the tickets, the type of which has been identified by the identifier 16, on the basis of the number of tickets to be issued (S24). The ticket manager 21 then stores the generated check sheet in the storage unit 55. For example, the ticket manager 21 generates the check sheet including a database indicating the history of classifying as being valid, with respect to each of the tickets having the ticket numbers from 1 to 1000, as shown in FIG. 10, and stores the check sheet in a memory region 55S in the storage unit 55. In addition, the ticket manager 21 puts a mark represented by a predetermined image, for example as cross-hatched in FIG. 10, on the tickets that have been classified as being valid, namely the tickets having the ticket number of 03, 447, 573, and 925 as shown in FIG. 10, to thereby store the history that those tickets have been classified as being valid, in the check sheet. Thus, the ticket manager 21 manages the tickets of the ticket number 03, the ticket number 447, the ticket number 573, and the ticket number 925, as valid tickets.

Then the controller 11 decides whether the document reading unit 32 has read the ticket (S25). In the case where the reading operation of the document reading unit 32 is not detected (NO at S25), the controller 11 sets the image forming apparatus 1 to the standby mode, instead of proceeding to step S26.

Figure 11:
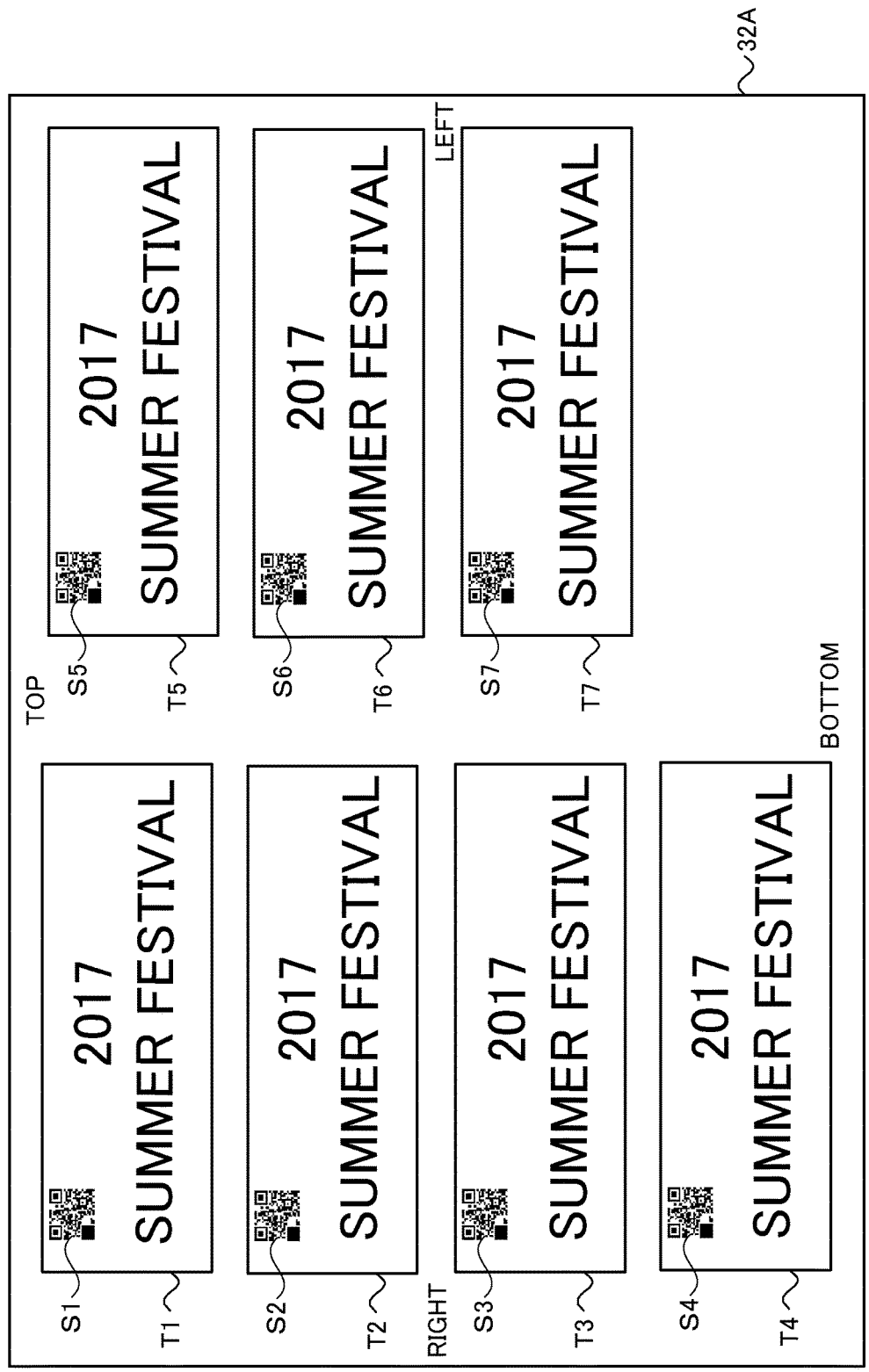
FIG. 11 is a schematic drawing for explaining a ticket reading operation performed by the image forming apparatus.

In contrast, upon detecting the reading operation of the document reading unit 32 document reading unit 32 (YES at S25), the controller 11 decides that the image data of the ticket to be managed has been stored in the image memory 34. For example, when seven tickets T1, T2, T3, T4, T5, T6, and T7 are placed on a glass table 32A of the document reading unit 32 as shown in FIG. 11, and the document reading unit 32 reads these tickets, image data containing the image data of the seven tickets is stored in the image memory 34. Here, the image shown in FIG. 11 represents the faces of the tickets T1 to T7 to be read by the document reading unit 32, viewed from the side of the reading mechanism 321 shown in FIG. 1. In addition, distinction images S1 to S7 are respectively printed on the tickets T1 to T7, as shown in FIG. 11.

The controller 11 then detects the rectangular shapes forming the outline of the tickets T1 to T7, for example by pattern matching with respect to the image data stored in the image memory 34, and decides that the image data containing the image data of the seven tickets T1 to T7 has been stored in the image memory 34. In addition, as shown in FIG. 11, the glass table 32A includes indices for identifying the position on the glass table 32A, for example characters indicating "top", "bottom", "left", and "right", so that the controller 11 detects the image data of these characters, for example by pattern matching, and detects the position of the image data of the tickets T1 to T7 in the image data stored in the image memory 34, on the basis of the image data of the characters.

Thereafter, the distinction image detector 17 detects the distinction image of each ticket, by pattern matching with respect to the image data stored in the image memory 34 (S26). For example, the distinction image detector 17 detects the seven distinction images S1 to S7 (see FIG. 11) through the mentioned pattern matching, and identifies, with respect to the detected distinction images S1 to S7, the corresponding tickets T1 to T7 on which the distinction images S1 to S7 are respectively printed, on the basis of the position of the image data of the tickets T1 to T7 detected by the controller 11, thereby detecting the distinction images S1 to S7 of the tickets T1 to T7.

Then, the code number extractor 18 analyzes the distinction image detected by the distinction image detector 17, thereby extracting the code number from the distinction image (S27). For example, the code number extractor 18 extracts the code number 890HGJFB4113218 embedded in the distinction image S4, by analyzing the distinction image S4 (see FIG. 11).

Then the ticket number acquirer 19 decrypts the code number extracted by the code number extractor 18 using the code key and the encryption method inputted at step S22, thereby acquiring the ticket number of the ticket (S28). For example, the ticket number acquirer 19 decrypts the code number 890HGJFB4113218 using the code key "2017 Summer Festival" and the encryption method "DES", thereby acquiring the ticket number 3 of the ticket T4 (see FIG. 11) on which the distinction image S4 is printed. Likewise, the ticket number acquirer 19 acquires, for example, the ticket number 23 of the ticket T1, the ticket number 9 of the ticket T2, the ticket number 17 of the ticket T3, the ticket number 54 of the ticket T5, the ticket number 27 of the ticket T6, and the ticket number 1234 of the ticket T7.

Thereafter, the decider 20 decides whether the ticket number acquired by the ticket number acquirer 19 agrees with the ticket number corresponding to the type of the ticket identified by the identifier 16, and stored in the storage unit 55 (S29). For example, the decider 20 decides whether the ticket number 3 acquired as above agrees with the ticket number stored in the memory region 55D of the storage unit 55 (see FIG. 7). When it is decided that the ticket number acquired by the ticket number acquirer 19 agrees with the ticket number stored in the storage unit 55 (YES at S29), the ticket manager 21 looks up the check sheet (see FIG. 10), to thereby decide whether the ticket, the number of which has agreed, has previously been classified as being valid (S30).

In the case where the ticket the number of which has agreed has not previously been classified as being valid (NO at S30), the ticket manager 21 decides that the ticket of such ticket number is valid, and manages accordingly (S31). For example, the ticket manager 21 classifies as being valid the ticket T1 of the ticket number 23, the ticket T2 of the ticket number 9, the ticket T3 of the ticket number 17, the ticket T5 of the ticket number 54, and the ticket T6 of the ticket number 27, as result of looking up the check sheet (see FIG. 10). Then the operation proceeds to step S32 to be subsequently described.

In contrast, when it is decided that the ticket number acquired by the ticket number acquirer 19 does not agree with the ticket number stored in the storage unit 55 (NO at S29), the ticket manager 21 classifies the ticket of the acquired ticket number as being invalid (S33). For example, when the decider 20 decides that the acquired ticket number 1234 does not agree with the ticket number stored in the memory region 55D of the storage unit 55 (see FIG. 7), the ticket manager 21 classifies the ticket T7, having the distinction image S7 corresponding to the ticket number 1234, as being invalid. Then the operation proceeds to step S32 to be subsequently described.

In the case where the ticket manager 21 decides that the ticket, the number of which has agreed, has already been classified as being valid (YES at S30), the ticket manager 21 decides that the corresponding ticket has been printed in duplicate (S34). For example, upon deciding that the ticket T4 of the ticket number 3 is registered as being valid in the check sheet, the ticket manager 21 decides that the ticket 4 has been printed in duplicate. For example, the ticket manager 21 decides that the ticket T4 of the ticket number 3 is not invalid, and also that the ticket T4 has already been classified as being valid, thus to decide that two tickets of the same ticket number 3 exist. Further, the ticket manager 21 enters a value "2" indicating the number of times that the ticket has been classified as being valid, in the column of the check sheet corresponding to the ticket number 3, as shown in FIG. 10.

Figure 12:
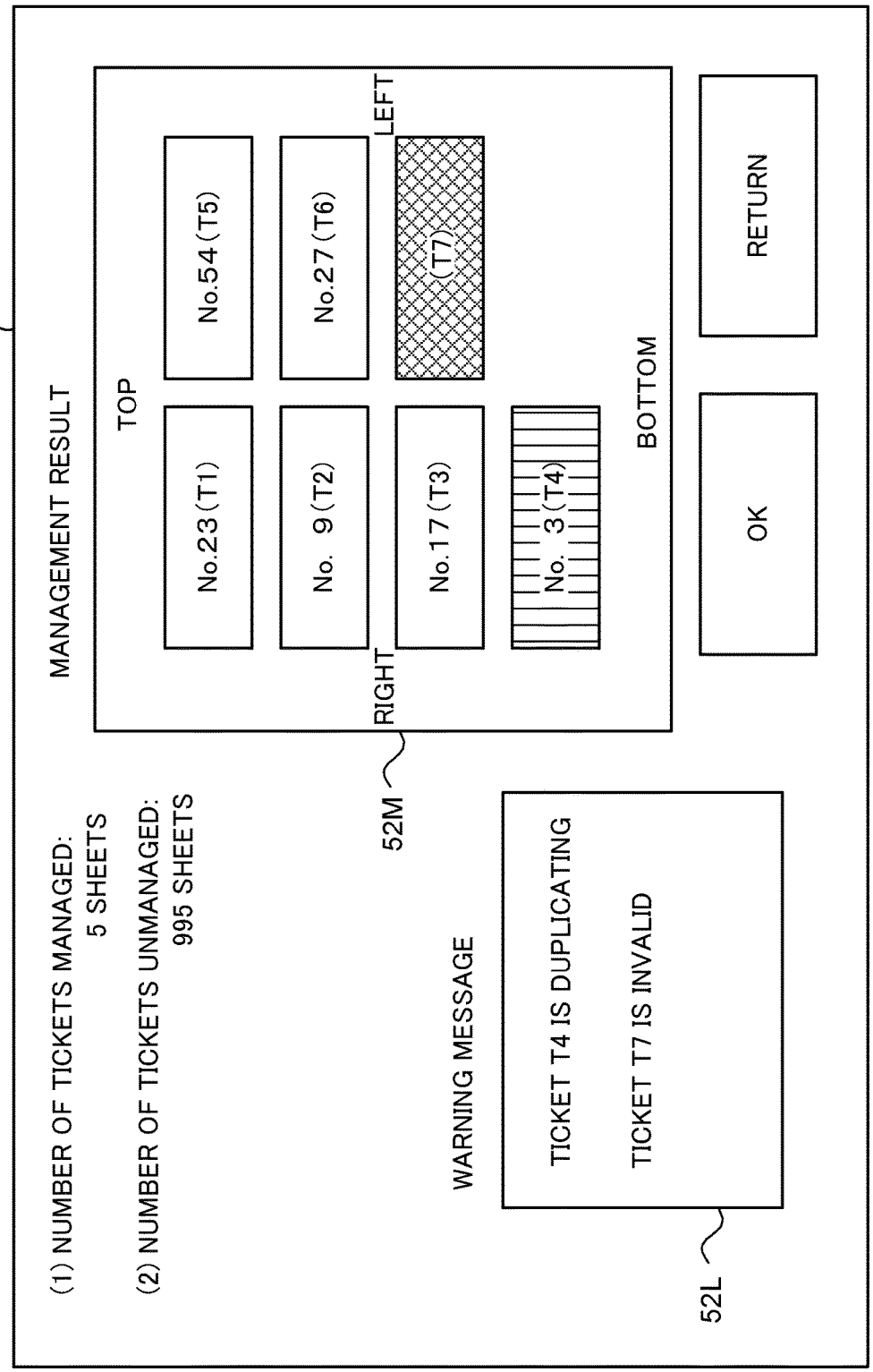
FIG. 12 is a schematic drawing showing an example of the screen displayed on a display unit of the image forming apparatus.

Thereafter, the display controller 12 causes the display unit 51 to display a screen representing the ticket number of the ticket managed by the ticket manager 21, and the detail of the management of the ticket (S32). For example, the display controller 12 causes the display unit 51 to display the ticket T1 of the ticket number 23, the ticket T2 of the ticket number 9, the ticket T3 of the ticket number 17, the ticket T5 of the ticket number 54, and the ticket T6 of the ticket number 27, classified as being valid by the ticket manager 21, without hatching in a display field 52M, as shown in FIG. 12. In contrast, the display controller 12 causes the display unit 51 to display the ticket T7 of the ticket number 1234 classified as being invalid by the ticket manager 21, and the ticket T4 of the ticket number 3, which has been printed in duplicate, with different predetermined hatching. Further, the display controller 12 causes the display unit 51 to display, as shown in FIG. 12, the characters indicating "top", "bottom", "left", and "right", corresponding to the indices provided on the glass table 32A (see FIG. 11), in the as display field 52M. Such an arrangement according to this embodiment facilitates the user to identify each of the tickets T1 to T7 which have been read.

Further, the display controller 12 causes the display unit 51 to display a warning message to the user, with respect to the ticket that has been printed in duplicate and the ticket classified as being invalid, by the ticket manager 21. For example, the display controller 12 causes the display unit 51 to display, as shown in FIG. 12, a warning message to the effect that the ticket T4 is duplicating, and a warning message to the effect that the ticket T7 is invalid, in a display field 52L.

As described thus far, in this embodiment, the code number generator 13 generates, when the operation reception unit receives, from the user, designation of the number of tickets to be issued, the predetermined code key, and the predetermined encryption method, the encrypted code number for each of the designated number of tickets, with respect to each of the ticket numbers sequentially allocated to the designated number of tickets, using the designated code key and the designated encryption method. The distinction image generator 14 generates, when the code number generator 13 generates the code number for each of the tickets, the distinction image for distinguishing one ticket from another, the distinction image containing the code number of the ticket generated for each of the tickets. The controller 11 adds, in each of the designated number of tickets, the distinction image of each of the tickets generated by the distinction image generator 14, to the image data of the original of the ticket read by the document reading unit 32, and causes the printing unit 33 to print each of the designated number of tickets. With the mentioned arrangement, the image forming apparatus 1 according to this embodiment can easily produce a multitude of tickets each having a different distinction image, unlike the conventional apparatuses.

With the image forming apparatus referred to above as the background art, the user has to create the distinction information by operating the operation panel. Accordingly, it is difficult to produce a multitude of tickets with the existing image forming apparatus, when the distinction information (distinction image) has to be changed for each of the tickets.

According to this embodiment, in contrast, a multitude of tickets each having a different distinction image can be easily produced.

In addition, according to this embodiment, the display controller 12 causes the display unit 51 to display, when the distinction image is generated, the preview image showing the example of the position of the distinction image in the image representing the ticket to be printed, using the generated distinction image and the image data, as shown in FIG. 6. In addition, the display controller 12 causes the display unit 51 to display, when the operation reception unit receives from the user the instruction to change the position of the distinction image in the preview image, the changed preview image in which the distinction image has been moved to the instructed position. When the operation reception unit receives from the user the instruction to determine the position of the distinction image, while the preview image is displayed, the controller 11 causes the printing unit 33 to print the ticket on which the distinction image is located at the position determined according to the instruction. The mentioned arrangement according to this embodiment enables the position of the distinction image in the image representing the ticket to be visually confirmed in the preview image displayed in the display unit, and allows the ticket shown in the preview image to be printed.

According to this embodiment, further, the storage unit 55 stores, in advance, the designated number of tickets to be issued, the designated code key, the designated encryption method, and the ticket number, with respect to each type of the ticket, as shown in FIG. 7. The input requester 15 requests the user, when the operation reception unit receives the instruction of management with respect to a predetermined ticket from the user, to input the number of tickets to be issued, the code key used for the ticket, and the encryption method used for the ticket. When the operation reception unit receives the user's input of the number of tickets to be issued, the code key used for the ticket, and the encryption method used for the ticket, the identifier 16 identifies the type of the ticket to be managed, on the basis of the number of tickets, the code key, and the encryption method which have been inputted. The distinction image detector 17 detects the distinction image from the image data of the ticket read by the document reading unit 32. The code number extractor 18 analyzes the distinction image detected by the distinction image detector 17, thereby extracting the code number from the distinction image. The ticket number acquirer 19 acquires the ticket number, by decrypting the code number extracted by the code number extractor 18, using the inputted code key and the inputted encryption method. The decider 20 decides whether the ticket number acquired by the ticket number acquirer 19 and the ticket number corresponding to the type of the ticket identified by the identifier 16 and stored in the storage unit 55 agree with each other. When the decider 20 decides that the acquired ticket number and the ticket number stored in the storage unit 55 agree with each other, the ticket manager 21 classifies the ticket of the agreeing ticket number as being valid. The mentioned arrangement according to this embodiment enables the management of the validity of the tickets to be printed.

Further, according to this embodiment, when the identifier 16 identifies the type of the ticket to be managed, the ticket manager 21 generates the check sheet for storing the history of classifying the ticket as being valid, with respect to each of the ticket numbers on the basis of the number of tickets to be issued, and stores the check sheet in the storage unit 55. In addition, upon detecting, from the generated check sheet, that the ticket of the same ticket number has been classified as being valid more than twice, the ticket manager 21 decides that the ticket has been printed in duplicate. Therefore, the arrangement according to this embodiment enables the management of duplicating tickets.

Still further, according to this embodiment, upon detecting that the ticket of the same ticket number has been classified as being valid more than twice, the ticket manager 21 stores the value indicating the number of times that the ticket has been classified as being valid, in the check sheet. The mentioned arrangement according to this embodiment enables the user to easily recognize the ticket number of the ticket that has been printed in duplicate, and the number of sheets of the duplicating ticket.

Still further, according to this embodiment, the display controller 12 causes the display unit 51 to display the screen representing the ticket number of the ticket managed by the ticket manager 21, and the detail of the management of the ticket, as shown in FIG. 12. The mentioned arrangement according to this embodiment enables the user to visually recognize the validity of the ticket easily.

The configurations and processings described with reference to FIG. 1 to FIG. 12 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
    an operation reception unit that includes an operation unit and a touch panel, the operation unit receiving an operation instruction from a user;
    a document reading unit that includes a reading mechanism and reads an original of a ticket;
    a printing unit that includes a photoconductor drum and an intermediate transfer belt, and performs a printing operation on a recording medium by forming a toner image on the photoconductor drum, transferring the toner image formed on the photoconductor drum onto the recording medium via the intermediate transfer belt, and fixing the toner image formed on the recording medium;
    a display unit that includes a display; and
    a control unit that includes a processor,
    wherein the control unit acts, when the processor executes a program, as
        a code number generator that generates, when the operation reception unit receives, from the user, designation of a number of tickets to be issued, a predetermined code key, and a predetermined encryption method, an encrypted code number for each of the designated number of tickets to be issued, with respect to each of ticket numbers sequentially allocated to the designated number of tickets to be issued, using the designated code key and the designated encryption method;
        a distinction image generator that generates, when the code number generator generates the code number for each of the tickets, a distinction image for distinguishing one ticket from another, the distinction image containing the code number of the ticket generated for each of the tickets;
        a controller that adds, in each of the designated number of tickets to be issued, the distinction image of each of the tickets generated by the distinction image generator, to image data of the original of the ticket read by the document reading unit, and causes the printing unit to print each of the designated number of tickets to be issued; and
        a display controller that controls a display operation of the display unit,
    the display controller causes the display unit to display, when the distinction image is generated, a preview image showing an example of a position of the distinction image in an image representing the ticket to be printed, using the generated distinction image and the image data, and causes the display unit to display, when the operation reception unit receives from the user an instruction to change the position of the distinction image in the preview image, a changed preview image in which the distinction image has been moved to the instructed position,
    the controller causes the printing unit, when the operation reception unit receives from the user an instruction to determine the position of the distinction image, while the preview image is displayed, to print the ticket on which the distinction image is located at the position determined according to the instruction,
    the image forming apparatus further comprises a storage device that stores, in advance, the designated number of tickets to be issued, the designated code key, the designated encryption method, and each of the ticket numbers sequentially allocated to the designated number of tickets to be issued, with respect to each of types of the ticket, and
    the control unit further acts, when the processor executes the program, as
        an input requester that requests the user, when the operation reception unit receives an instruction of management with respect to a predetermined ticket from the user, to input the number of tickets to be issued, the code key used for the ticket, and the encryption method used for the ticket;
        an identifier that identifies, when the operation reception unit receives the user's input of the number of tickets to be issued, the code key used for the ticket, and the encryption method used for the ticket, the type of the ticket to be managed, on a basis of the number of tickets to be issued, the code key, and the encryption method which have been inputted;
        a distinction image detector that detects the distinction image from the image data of the ticket read by the document reading unit;

a code number extractor that extracts the code number from the distinction image, by analyzing the distinction image detected by the distinction image detector;

a ticket number acquirer that acquires the ticket number, by decrypting the code number extracted by the code number extractor, using the inputted code key and the inputted encryption method;

a decider that decides whether the ticket number acquired by the ticket number acquirer and the ticket number corresponding to the type of the ticket identified by the identifier and stored in the storage device agree with each other; and a ticket manager that classifies, when the decider decides that the acquired ticket number and the ticket number stored in the storage device agree with each other, the ticket of the agreeing ticket number as being valid.

2. The image forming apparatus according to claim 1, wherein the ticket manager generates, when the identifier identifies the type of the ticket to be managed, a check sheet for storing a history of classifying the ticket as being valid, with respect to each of the ticket numbers on a basis of the number of tickets to be issued, stores the check sheet in the storage device, and decides, upon detecting that a ticket of the same ticket number has been classified as being valid more than twice, that the ticket has been printed in duplicate.

3. The image forming apparatus according to claim 2, wherein, upon detecting that the ticket of the same ticket number has been classified as being valid more than twice, the ticket manager stores a value indicating the number of times that the ticket has been classified as being valid, in the check sheet.

4. The image forming apparatus according to claim 1, wherein the display controller causes the display unit to display the ticket number of the ticket managed by the ticket manager, and details of the management of the ticket.

5. The image forming apparatus according to claim 4, wherein, when the decider decides that the ticket number acquired by the ticket number acquirer and the ticket number stored in the storage device disagree, the ticket manager classifies the ticket of the disagreeing ticket number as being invalid.

6. The image forming apparatus according to claim 1, wherein the distinction image generator generates, when the operation reception unit receives, from the user, designation of a type of the distinction image to be generated, the distinction image of the ticket corresponding to the code number, the code number being contained in the distinction image of the designated type.

* * * * *